United States Patent
Sastry et al.

(10) Patent No.: US 7,721,322 B2
(45) Date of Patent: May 18, 2010

(54) ENTERPRISE SERVICE-TO-SERVICE TRUST FRAMEWORK

(75) Inventors: Hari V. N. Sastry, San Jose, CA (US); Ramana Rao Turlapati, Fremont, CA (US); Saurabh Shrivastava, Fremont, CA (US); Stephen Man Lee, San Francisco, CA (US); Raymond K. Ng, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 894 days.

(21) Appl. No.: 11/387,644

(22) Filed: Mar. 22, 2006

(65) Prior Publication Data

US 2007/0118878 A1 May 24, 2007

Related U.S. Application Data

(60) Provisional application No. 60/739,237, filed on Nov. 22, 2005.

(51) Int. Cl.
*H04L 29/00* (2006.01)
(52) U.S. Cl. ........... 726/1; 726/3; 726/8; 709/206; 713/201
(58) Field of Classification Search ............ 726/1, 726/3, 8; 709/206; 713/201
See application file for complete search history.

(56) References Cited

U.S. PATENT DOCUMENTS

| 6,779,020 | B1 * | 8/2004 | Henrick | 709/206 |
|---|---|---|---|---|
| 7,350,229 | B1 * | 3/2008 | Lander | 726/8 |
| 2003/0177388 | A1 * | 9/2003 | Botz et al. | 713/201 |
| 2004/0123144 | A1 * | 6/2004 | Chan et al. | 713/201 |

* cited by examiner

*Primary Examiner*—Nasser Moazzami
*Assistant Examiner*—Ghazal Shehni
(74) *Attorney, Agent, or Firm*—Townsend and Townsend and Crew LLP

(57) ABSTRACT

Embodiments of the invention provide a trust framework for governing service-to-service interactions. This trust framework can provide enhanced security and/or manageability over prior systems. Merely by way of example, in some cases, an information store can be used to store information security information (such as trust information, credentials, etc.) for a variety of services across an enterprise. In other cases, the trust framework can provide authentication policies to define and/or control authentication between services (such as, for example, types of authentication credentials and/or protocols are required to access a particular service—either as a user and/or as another service—and/or types of authentication credentials and/or protocols a service may be enabled to use to access another service). Alternatively and/or additionally, the trust framework can provide authorization policies to define and/or control authorization between services.

23 Claims, 5 Drawing Sheets ature, credentials, etc.) for a variety of services across an enterprise. In other cases, the trust framework can provide authentication policies to define and/or control authentication between services (such as, for example, types of authentication credentials and/or protocols are required to access a particular service—either as a user and/or as another service—and/or types of authentication credentials and/or protocols a service may be enabled to use to access another service). Alternatively and/or additionally, the trust framework can provide authorization policies to define and/or control authorization between services (such as, for example, whether a calling service has authority to request an operation from another service, based perhaps on an identity of a user for whom the calling service is proxying).

ENTERPRISE SERVICE-TO-SERVICE TRUST FRAMEWORK

CROSS-REFERENCE TO RELATED APPLICATIONS

This application is a nonprovisional, and claims the benefit, of provisional U.S. Patent Application No. 60/739,237, filed Nov. 22, 2005, by Sastry et al. and entitled "Enterprise Service-To-Service Trust Framework," the entire disclosure of which is incorporated herein by reference.

FIELD OF THE INVENTION

The present invention relates to computer authentication/authorization systems in general and in particular to solutions to provide service-to-service authentication and/or authorization functions.

BACKGROUND OF THE INVENTION

Modern enterprise computing systems often rely on multiple applications that collaborate and/or interact with each other (often through the use of services). In some cases, this interaction serves the goal of performing a requested operation (and/or set of operations) in response to a user request. For instance, if a user requests an operation or service from one application, that application, as part of responding to the user request might need to interact with a service provided by another application.

Merely by way of example, in Oracle Corp.'s Oracle Collaboration Services™ ("OCS"), various components (including without limitation, email, calendar, file sharing, web conferencing, etc.) often will invoke one another in response to user request. When scheduling a meeting in the calendar component, for instance, a user might be given the option to set of a web conference for that meeting. A variety of other applications interact similarly, including for example, customer relations management software, enterprise resource planning software, various office applications, and the like.

In many cases, such inter-application interactions require that one application proxy for the user in requesting services from another application. In existing systems, a called service typically either will maintain its own local security policy and/or will trust the calling application implicitly. Hence, in many cases, these service-to-service requests can lead to manageability issues.

For example, in the typical environment, each application will implement its own policy mechanism to deal with security issues in a service-to-service context, requiring configuration and/or management of multiple, often disparate security models throughout the enterprise. Further, without a uniform security framework, these service-to-service interactions created additional security issues. Merely by way of example, in some cases, a particular service, when called by another service, might rely on the calling service to perform user authentication and/or authorization, while the calling service might not be configured to require user authentication and/or authorization, leading to a security vulnerability.

BRIEF SUMMARY OF THE INVENTION

Embodiments of the invention provide a trust framework for governing service-to-service interactions. This trust framework can provide enhanced security and/or manageability over prior systems. Merely by way of example, in some cases, an information store can be used to store information security information (such as trust information, credentials, etc.) for a variety of services across an enterprise. In other cases, the trust framework can provide authentication policies to define and/or control authentication between services (such as, for example, types of authentication credentials and/or protocols are required to access a particular service—either as a user and/or as another service—and/or types of authentication credentials and/or protocols a service may be enabled to use to access another service). Alternatively and/or additionally, the trust framework can provide authorization policies to define and/or control authorization between services (such as, for example, whether a calling service has authority to request an operation from another service, based perhaps on an identity of a user for whom the calling service is proxying).

Various embodiments of the invention, therefore, can provide enhanced security and/or manageability across an enterprise. In an aspect of some embodiments, for example, a trust framework can enable multiple applications across an enterprise to interact, based on policies established for the applications and/or trust information about the applications (some or all of which may be stored at a centralized policy repository). In this way, for example, the management of interactions between applications can be simplified, as the policies can be maintained in a central location, requiring reduced configuration at the applications themselves. Similarly, in many embodiments, comprehensive security can be provided for inter-application interactions, e.g., by maintaining a centralized set of policies, such that individual applications know and can rely on the type of authentication and/or authorization implemented by calling applications and/or such that appropriate authentication and/or authorization can be required for access to applications.

One set of embodiments provides systems, including without limitation systems for providing authentication and/or authorization, e.g., in response to a service request from a client computer. An exemplary system might comprise a centralized policy server, a first server computer (which might comprise and/or provide a first service) and a second server computer (which might comprise and/or provide a second service). (In some cases, the same server computer might comprise and/or provide both the first and second services).

In some embodiments, the centralized policy server might comprise a centralized policy repository. The centralized policy repository may include, without limitation, some or all of the following information: an information store, which might be configured to store a plurality of sets of trust information, each of which might comprise trust information about one of a plurality of services (such trust information can include, without limitation, credentials, identifiers, password verifiers, etc. associated with one or more services, as well as application-specific requirements, abilities, configurations, etc.); one or more authentication policies, each of which might define a set of authentication requirements for a particular service; one or more authorization policies, each of which might define a set of authorization requirements for a particular service; and/or one or more authorization policies, each of which might define a set of authorization requirements for a particular service. (In some cases, the centralized policy repository may be implemented in a directory services, such as a lightweight directory access protocol ("LDAP") directory.)

In other embodiments, the first server comprises a first processor and a first set of instructions executable by the first processor. The first set of instructions might comprise, merely by way of example, instructions to receive (e.g., with the first service) a service request from a client computer and/or instructions to ascertain that the service request requests an operation to be performed by second service at a second server computer. In particular embodiments, the first set of instructions further includes instructions to obtain from the centralized policy repository an identifier of the first service (the identifier might be, merely by way of example, an identifier that is unique across the enterprise trust framework and that allows identification of the service from among a plurality of services, users and/or other entities). There might also be instructions to transmit a request for the operation for reception by the second server computer. The request might comprise the identifier of the first service.

The second server computer might comprise a second processor and a second set of instructions executable by the second processor. In various embodiments, the second set of instruction might comprise one or more of the following: instructions to receive, (e.g., with the second service) the request for the operation from the first server computer; instructions to transmit an authentication request for reception by the centralized policy server (in some cases, the authentication request might the identifier, so that, for example, the centralized policy server can identify trust information about the first (calling) service); instructions to transmit an authorization request for reception by the centralized policy server; and/or instructions to provide the requested operation, e.g., based on an authentication status and/or an authorization status of the first server (which might be provided by the centralized policy server and/or might be determined by the second server, e.g., based on information provided by the centralized policy server).

In particular embodiments, the centralized policy server further comprises a third processor and a third set of instructions executable by the third processor. The third set of instructions might comprise instructions to receive the authentication request (e.g., from the second server) and/or instructions to identify the first service, based on the identifier. In some cases, the centralized policy server will determine, perhaps based on an authentication policy for the second service, a set of authentication information for the first service. The set of authentication information may be sufficient to authenticate the first service. The centralized policy server may have further instructions to provide the set of authentication information to the second server computer. Merely by way of example, the authentication information may confirm an authentication status of the first service. Alternatively and/or additionally, the authentication information might comprise information (such as a password and/or a password verifier associated with the first service) that can be used by the second service (and/or second server) to authenticate (e.g., determine an authentication status of) the first service.

In some cases, the system also comprises an API, which might be configured allow the first service and the second service to communicate with the centralized policy repository. In a set of embodiments, the centralized policy server might also have instructions to receive the authorization request and/or instructions to determine, perhaps based on an authorization policy for the second service, a set of authorization information for the first service. In some cases, the set of authorization information being sufficient to indicate whether the first service is authorized for the second service. The centralized policy server might then provide the set of authorization information to the second server computer. Once again, this authorization information might simply comprise an authorization status (e.g., a confirmation, based perhaps on the second service's authorization policy(ies) that the first service is or is not authorized to request the operation from the second service) and/or information to allow the second service (and/or second server) to determine the authorization status of the first service.

In a particular set of embodiments, a system for authenticating and/or authorizing various service-to-service interactions might simply comprise a centralized policy server, such as the server described above, for example. The centralized policy server might be configured to receive requests from a calling service and/or a called service, such as the first and second services described above, and/or to provide appropriate responses to such requests.

Another set of embodiments comprises methods, including without limitation methods of providing authentication and/or authorization among a plurality of services. An exemplary method might be used in a computer environment comprising a plurality of services (which might be, but need not be distributed across a plurality of network nodes). The plurality of services might comprise a target service that is configured to perform a requested operation and a source service that requests the requested operation.

The exemplary method comprises, in some embodiments, receiving (e.g., at a centralized policy repository) a first request from the target service. The first request might comprise a request for authentication information about the source service. The method, then, might comprise determining, perhaps based on an authentication policy for the target service, a set of trust information required by the target service for authentication and/or providing a first response (which might comprise information for authenticating the source service) to the target service. Merely by way of example, providing a first response to the target service might comprise providing sufficient information to allow the target service to authenticate the source service. In a particular set of embodiments, the method might comprise authenticating the source service at the centralized policy repository, based on the set of trust information required by the target service for authentication; such that providing a first response to the target service might comprise providing an authentication status of the source service.

In some cases, the determination might be made at the centralized policy repository. In some embodiments, the authentication policy for the target service specifies a set of authentication criteria a user must meet to authenticate with the source service. Alternatively and/or additionally, the authentication policy for the target service might specify a set of authentication criteria the source service must meet to authenticate with the target service.

In other cases, the method comprises receiving, (again, perhaps at the centralized policy repository) a second request from the target service. The second request might comprise a request for authorization information about an authorization of the source service to access the target service. The method then, might include determining (perhaps based on an authorization policy for the target service) a set of authorization requirements for the source service and/or providing a second response to the target service. The second response might comprise information about authorizing the source service.

In accordance with various embodiments, the authorization policy for the target service might specify a set of authorization criteria a user must meet to authorize with the source service. In a particular implementation, the method might comprise authorizing the source service at the centralized policy repository, based perhaps on the authorization requirements for the source service, and/or providing a second response to the target service might comprise providing an authorization status of the source service. In another implementation, providing a second response to the target service might comprise providing sufficient information to allow the target service to authorize the target service.

In some cases, one or more procedures in this method might be performed by a centralized policy server, and/or at a centralized policy repository. In particular embodiments, as mentioned above, the centralized policy repository might comprise and/or be incorporated in a directory service and/or database, such as an LDAP directory. In other embodiments, the first request and/or the second request are received via an API, which might be configured to facilitate communication between the plurality of services and the centralized policy repository.

Embodiments of the invention support a variety of configurations. Merely by way of example, in some embodiments, the target service might be provided by a first application (and/or a first computer) and/or the source service might be provided by a second application (and/or a second computer). In other embodiments, the target service and the source service might provided by the same application (and/or the same computer).

Another exemplary method in accordance with a set of embodiments provides a service-to-service trust framework in a computer environment, which might, in some cases, comprise a plurality of services distributed across a plurality of network nodes. The method might comprise providing (for example, at a centralized policy repository) an information store configured to store trust information related to each of the plurality of services and/or providing an authorization model to define an interaction between the two or more services. In some cases, the two or more services comprise a target service that is configured to perform a requested operation and a source service that requests the requested operation.

The method might further comprise providing (perhaps at the centralized policy repository) at least one authentication policy for the target service to define a set of authentication requirements for the target service and/or providing (again, possibly at the centralized policy repository) at least one authorization policy for the target service to define a set of authorization requirements for the target service. In some cases, the method comprises providing an application programming interface ("API") to allow each of the two or more services to communicate with the information store.

In some cases, the information store (and/or the centralized policy repository) may be centralized within an enterprise-wide network. In a particular set of embodiments, the method further comprises providing an administration model, which can be used to define a procedure for managing information in the information store.

In an aspect of some embodiments, the method might further comprise receiving, at the information store and via the API, a request from the target service to authenticate and/or authorize the source service. The method might further comprise providing a response to the request. In some cases, the source service might be authenticated at the information store, based on the authentication policy. Alternatively and/or additionally, the method might include determining (based on the authorization model, for example), whether the source service is authorized to obtain the request operation. Hence, the response might include an authentication and/or authorization status of the source service. (In other embodiments, as noted above, the response might provide sufficient information to allow the target service to authenticate the source service and/or determine the authorization of the source service.)

In some cases, the source service might serve as a proxy for separate entity (such as a user calling the source service, to name but one example), and/or authenticating the source service comprises verifying an authentication of the separate entity according to the authentication policy. In other cases, authorizing the source service might comprise verifying an authorization of the separate entity to use the source service and/or the target service, perhaps according to the authorization policy.

Other sets of embodiments provide software programs, including without limitation software programs comprising instructions executable by one or more computers to implement methods of the invention and/or software programs comprising instructions executable by systems of the invention, as described above, for example. In a particular set of embodiments, a software service-to-service framework might facilitate interactions between two or more services.

In some cases, the framework might comprise an information store configured to store trust information related to each of the plurality of services and/or an authorization model to define an interaction between the two or more services. The two or more services might comprise a target service that is configured to perform a requested operation and a source service that requests the requested operation. The framework might further comprise an administration model, which might define a procedure for managing information in the information store.

In other cases, the framework might comprise at least one authentication policy for the target service to define a set of authentication requirements for the target service and/or at least one authorization policy for the target service to define a set of authorization requirements for the target service. Additionally and/or alternatively, the framework might comprise an application programming interface ("API") to allow each of the two or more services to communicate with the information store.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Embodiments of the invention provide a trust framework for governing service-to-service interactions. This trust framework can provide enhanced security and/or manageability over prior systems. Merely by way of example, in some cases, an information store can be used to store information security information (such as trust information, credentials, etc.) for a variety of services across an enterprise. In other cases, the trust framework can provide authentication policies to define and/or control authentication between services (such as, for example, types of authentication credentials and/or protocols are required to access a particular service—either as a user and/or as another service—and/or types of authentication credentials and/or protocols a service may be enabled to use to access another service). Alternatively and/or additionally, the trust framework can provide authorization policies to define and/or control authorization between services (such as, for example, whether a calling service has authority to request an operation from another service, based perhaps on an identity of a user for whom the calling service is proxying).

Various embodiments of the invention, therefore, can provide enhanced security and/or manageability across an enterprise. In an aspect of some embodiments, for example, a trust framework can enable multiple applications across an enterprise to interact, based on policies established for the applications and/or trust information about the applications (some or all of which may be stored at a centralized policy repository). In this way, for example, the management of interactions between applications can be simplified, as the policies can be maintained in a central location, requiring reduced configuration at the applications themselves. Similarly, in many embodiments, comprehensive security can be provided for inter-application interactions, e.g., by maintaining a centralized set of policies, such that individual applications know and can rely on the type of authentication and/or authorization implemented by calling applications and/or such that appropriate authentication and/or authorization can be required for access to applications.

Figure 1:
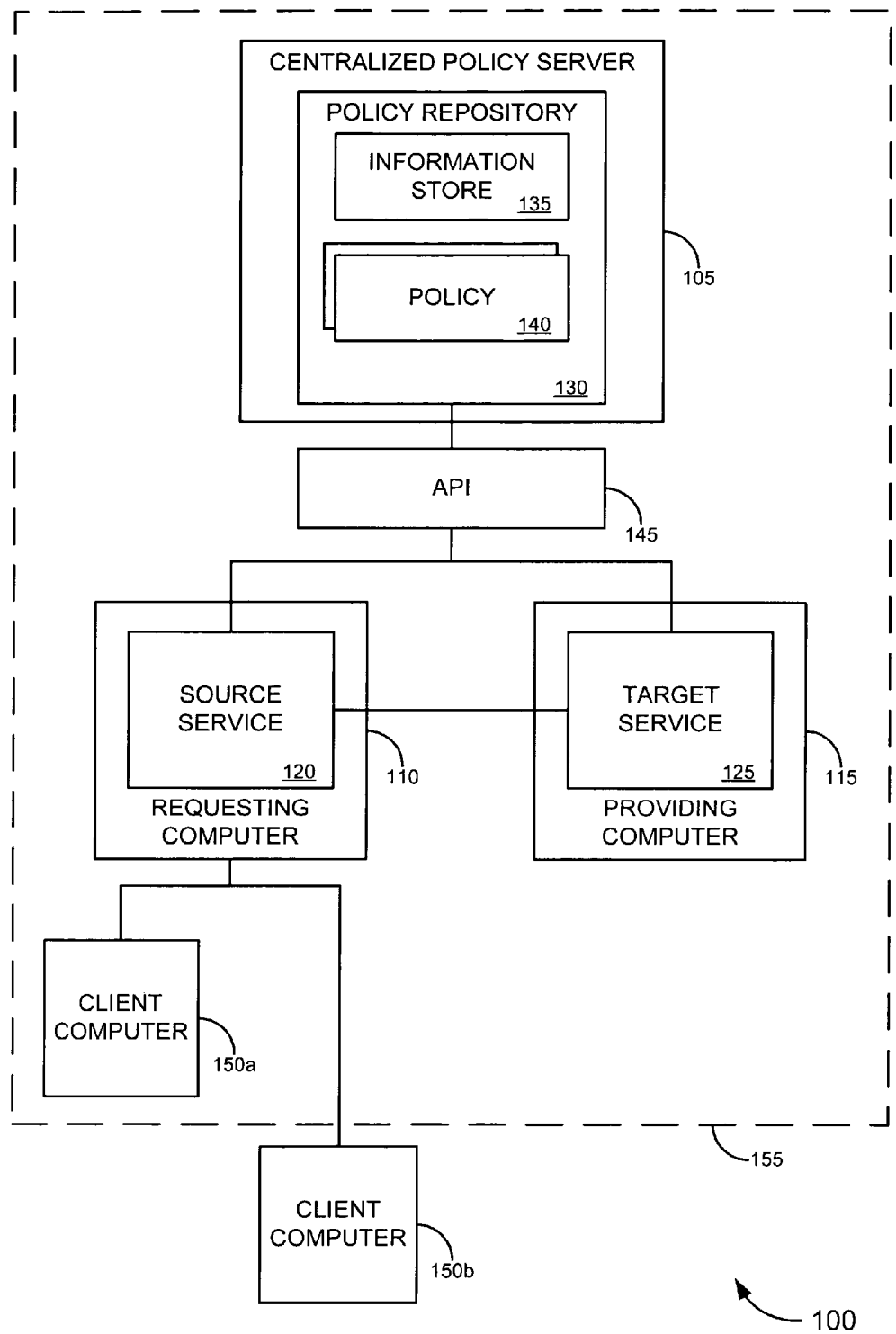
FIG. 1 is a block diagram illustrating the functional components of system for providing authentication and/or authorization services, in accordance with various embodiments of the invention.

One set of embodiments provides systems, including without limitation systems for providing authentication and/or authorization, e.g., in response to a service request from a client computer. FIG. 1 illustrates an exemplary system 100 that can be used to implement a service to-service trust framework and/or to authentication and/or authorize services to interact with other services. As used herein, the term "service" is used to connote any functionality or interface that an application, application component and/or set of applications might provide to another entity. Services can include, without limitation, database services, web services, other application services, file services, print services, directory services, electronic mail services, conferencing services, calendaring services and/or the like.

The other entity might be, depending on the circumstances and/or the embodiments, an end user, an application, an operating system call, and/or the like. (In some cases, the other entity might be the application itself, such that an application can provide services to itself; in such cases, embodiments of the invention can be used to supply authentication/authorization services even in the situation where an application provides a service to itself, for example, if an application authenticates a user and then calls another instance of itself to perform a service for that user.)

In a set of embodiments, the system 100 might be implemented within an enterprise environment (indicated by reference numeral 105). An enterprise environment is any set of computing resources that extends across some or all of an organization's structure, locations, functions, and/or the like. Examples of enterprise computing environments and applications are well-known and include, merely by way of example, electronic mail applications, collaboration applications, calendaring applications, database applications, business applications (such as ERP applications, CRM applications, supply chain management applications, and/or the like), web-based applications and a variety of others.

The system 100 of FIG. 1 includes a centralized policy server 105, and/or one or more server computers, which comprise any of a variety of servers providing any of a variety of services (including without limitation those described below). Merely by way of example, the system 100 might include a first computer 110 and/or a second computer 115 (either or both of which often will be a server). For ease of reference, the first computer 110 is referred to herein as the "requesting computer," while the second computer 115 is referred to as a "providing computer," to indicate that, in some embodiments, the first computer 110 requests an operation from the second computer 115, as described in detail below. (As used herein, the term "operation" means any type of function (which may or may not return output to a calling entity) that can be performed by an application and/or a service provided by that application.)

It should be noted that, while for ease of illustration, only one source service 120 and target service 125 are illustrated on FIG. 1, various embodiments may include a plurality of source and/or target services, which may be provided by one or more computers across the enterprise 155 other than the requesting computer 110 and the providing computer 115. In addition, one skilled in the art will appreciate, based on the disclosure herein, that a given service might function as a source and/or target service at various times, according to the implementation. Further, the centralized policy repository 130 may be replicated and/or partitioned across a plurality of centralized policy servers, as appropriate, to provide scalability and/or fault tolerance.

In various embodiments of the invention, the requesting computer 110 might be configured to comprise and/or provide a source service 120 (which might be performed and/or by provided by an application running on the computer 110). Similarly, the providing computer 115 might be configured to comprise and/or provide a target service 125 (which might be provided by an application running on the computer 115). It should be noted that, in some cases, same server computer might comprise both the requesting computer 110 and the providing computer. As used herein, the term "source service" means a service that requests an operation (often on behalf on another entity, such as a user, another service, etc.) from another service, which is referred to herein as the "target service." (The term "calling service" can also be used to describe the source service, while the term "called service" can be used to describe the target service.)

In some embodiments, the centralized policy server 105 might comprise a centralized policy repository 130. In a set of embodiments, the centralized policy repository 130 can be used to hold a variety of security and/or administration information, including, without limitation, policies governing authentication and/or authorization to use various services throughout the enterprise 155, trust information (including credentials, such as identifiers, passwords and/or password verifiers, other information related to the trustworthiness—or lack thereof—of various applications, services and/or other entities and/or the like), information necessary to use various services (such as IP addresses, port numbers, and/or the like), and/or other relevant information. (As used herein, the term "password verifier" means any data that can be used to determine the validity of a provided password, in some cases without exposing the password itself. So, for example, a password verifier may be a hash generated from a password. Hence, in some embodiments, a password verifier for a calling service, user, etc. may be provided to the centralized policy repository, a called service, etc. to allow verification that the password provided by the calling service, user, etc. is in fact the correct password, without exposing the correct password to disclosure.)

Merely by way of example, in a particular set of embodiments, the centralized policy repository 130 may include, without limitation an information store 135, which might be configured to store a plurality of sets of trust information. In particular, there may be a set of trust information about one or more of the services service (e.g., 120, 125) within the enterprise 155. Merely by way of example, such trust information can include, without limitation, the information described above, such as credentials, identifiers, password verifiers, etc. associated with one or more services, as well as application-specific requirements, abilities, configurations, etc.

The centralized policy repository 130 may also include one or more authentication policies and/or authorization policies (collectively referenced as 140). Merely by way of example, there may be an authentication policy defined for each of one or more services (e.g., 120, 125) within the enterprise. In a set of embodiments, an authentication policy might be used to define a set of authentication requirements for a particular service (and/or a plurality of services—in some cases, a single authentication policy might be shared by multiple services; likewise a particular service might have more than one authentication policy). Merely by way of example, an authentication policy for a particular target service 125 might require a calling source service 120 to verify that a user calling the source service to be authenticated before it will provide the requested operation to the calling service 120. Alternatively and/or additionally, a particular target service 125 might require a particular type of authentication (e.g., using a particular standard, such as Kerberos, a particular certificate, etc.) from the calling service 120 itself. As noted, in some implementations, the authentication policies for a plurality of services are maintained at the centralized policy repository 130, allowing for centralized maintenance and/or configuration, reducing maintenance overhead and allowing comprehensive security to be applied more effectively across the enterprise 155.

In some embodiments, the centralized policy repository 130 also includes one or more authorization policies. Each of the authorization policies might define a set of authorization requirements for a particular service (or for a plurality of services—as with authentication policies, more than one service might share an authorization policy in some embodiments of the invention, while in other embodiments, a given service might have multiple authorization policies).

In some cases, the centralized policy repository 130 may comprise and/or may be implemented in a directory services, such as a lightweight directory access protocol ("LDAP") directory, Microsoft's Active Directory™ and/or any other appropriate directory. One skilled in the art will appreciate, based on the disclosure herein that such a directory can be used to identify a plurality of entities (users, computers, services, etc.) both within and outside of an enterprise. Advantageously, then, certain embodiments provide the ability to supplement such a directory with a trust framework, providing a centralized location for both directory information and a variety of trust information, policies, etc. Merely by way of example, in some embodiments, a directory entry for a service, user, etc. might include the relevant trust information and/or policies for that entity (perhaps in encrypted and/or otherwise protected form, to prevent unauthorized access).

In a set of embodiments, the system 100 also includes an application programming interface ("API") 145 that can provide connectivity between the centralized policy repository 130 and various services (e.g., 120, 125) that might have need to access information in the centralized policy repository 130. Merely by way of example, the API 145 might comprise a plurality of methods and/or functions that a service can call to obtain information from the centralized policy repository 130. Such methods/functions might simply provide access to data in the centralized policy repository 130. In other cases, the methods/functions might process information before providing data (merely by way of example, in some cases, as described below, such functions might cause the centralized policy server 105 to determine the authentication status of an entity and/or the authorization of an entity to use a target service, and/or to return the determined status via the API). In various embodiments, portions of the API 145 may be included in the computers 110, 115 (and/or services 120, 125) and/or in the centralized policy server 105. Merely by way of example, in some embodiments, the providing computer 115 may include the API 145 to allow the target service 125 to communicate with the centralized policy server 105 without requiring the developers of the target service 125 to be aware of the internal processes used by the centralized policy server 105 to receive and/or respond to requests from the target service 125.

The system 100 might also include one or more client computers 150, which can be used by a user to request services. Merely by way of example, a client computer 150 might call the source service 120 to perform a particular operation. The source service 120, as detailed below, might call the target service 115 to perform the operation. Merely by way of example, in a particular embodiment, the source service 120 might be a web server, and a web browser on a client 150 might access a web page provided by the source service 120. The web page might provide an interface to an email function provided by the target service 125. To provide web-based email then, the source service 115 might call the target service 125. As another example, the source service 120 might be provided by a calendar application and, the client 150 might call (via a web browser, dedicated client, etc) the source service 120 to schedule a meeting. The target service 125, then, might be a web conferencing service, which the source service 120 might call to provide web conferencing capabilities for the scheduled meeting.

In some cases, there may be a plurality of client computers 150a, 150b. One or more of the clients 150a might reside within the enterprise 155, while one or more of the clients 150b might reside outside the enterprise 155. Hence, in embodiments of the invention, even if the trust framework is provided within an enterprise, it ultimately can be used to service end-user requests from outside the enterprise (e.g., via a public interface, such as a web server, etc.).

In accordance with certain embodiments of the invention, a service-to-service trust framework may be implemented (e.g., by the system 100). In some cases, the framework might comprise an information store (such as the information store 135) configured to store trust information related to each of the plurality of services (as described above, for example).

The framework might also comprise one or more authorization models, each of which can be used to define an interaction between two or more services. Merely by way of example, an authorization model might dictate a challenge-response protocol for authentication between a calling service and a called service. The framework might further comprise an administration model, which might define a procedure for managing information in the information store. Merely by way of example, the administration framework might define how applications and/or services are registered to a centralized policy repository, how information is accessed and/or modified within the centralized policy repository, etc.

In other cases, the framework might comprise one or more authentication policies for registered services, which, as noted above, can define authentication requirements for those services. Similarly, the framework might comprise one or more authorization policies for registered services. In some embodiments, the framework provides an API, as described above.

Figure 2:
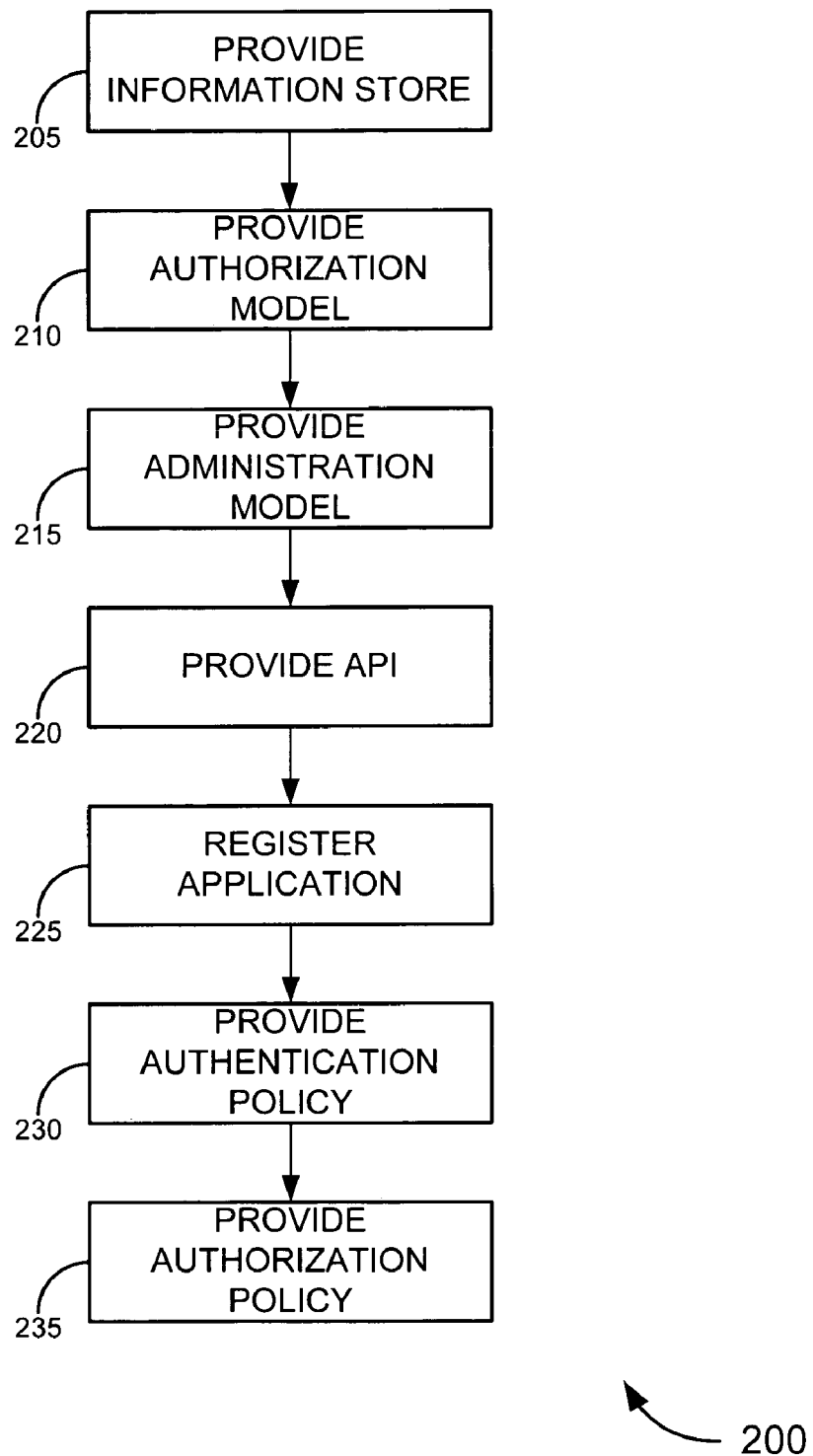
FIG. 2 is a process flow diagram illustrating a method of providing a service-to-service trust framework, in accordance with various embodiments of the invention.
Figure 3:
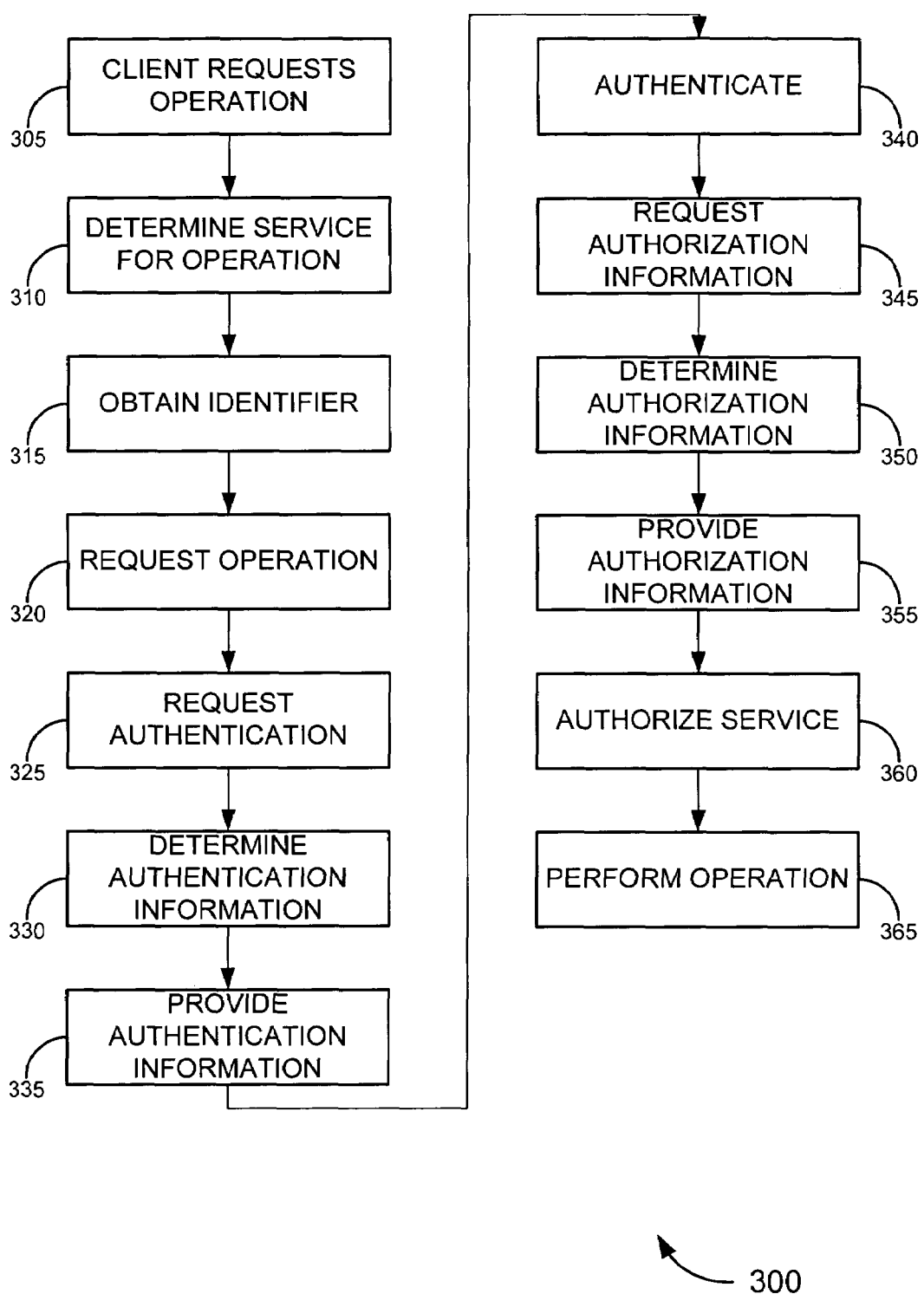
FIG. 3 is a process flow diagram illustrating a method of authenticating and/or authorizing a service using a service-to-service trust framework, in accordance with various embodiments of the invention.

In accordance with certain embodiments, the framework might govern interactions between services 120 and 125 in the system 100. Merely by way of example, FIGS. 2 and 3 illustrate the operation of the system 100 of FIG. 1 in accordance with various embodiments. It should be noted, however, that while for ease of description, the methods 200 and 300 of FIGS. 2 and 3, respectively, are described with respect to the system of FIG. 1, methods of the invention are not limited to any particular structural and/or functional implementation. Likewise, the operation of systems of the invention is not limited to any particular method.

Turning to FIG. 2, the method 200 can be used to implement a service-to-service trust framework (e.g., within an enterprise 155, across a plurality of enterprises, etc.). Merely by way of example, the method 200 might be implemented in a system 100 comprising a plurality of services (e.g., 120, 125), which may be resident on a single computer and/or distributed across a plurality of network nodes (as used herein, the term "network node" is meant to indicate any device capable of communicating via a network, such as, merely, the servers 110, 115 and/or clients 150). In some embodiments, the method 200 comprises providing (for example, at the centralized policy repository 130) an information store 135 (block 205), which as noted above, might be configured to store trust information related to each of the plurality of services (e.g., 120, 125).

The method 200 might further comprise providing an authorization model (block 210) to define an interaction between the services 120, 125. (Once again, it should be noted that there may be many services, and in some cases, an authorization model might be provided to define interactions between any two services. In some implementations, a single authorization model might define interactions between any two of a variety of services, while in other implementations, an authorization model might be specific to a given pairing of source-target services.)

In a particular set of embodiments, the method further comprises providing an administration model (block 215), which, as noted above, can be used to define a procedure for managing information in the information store, and/or providing an API (block 220), which can provide connectivity between the centralized policy repository 130 (and/or centralized policy server 105) and the services 120, 125. In a set of embodiments, each application and/or service 120, 125 within the framework is registered with the centralized policy repository 130 (block 225).

In a set of embodiments, registration of services enables the centralized policy repository 130 to provide trust services between registered applications. Registration of a service can take any of several forms. Merely by way of example, in some cases, the administrative model might provide a uniform registration process (perhaps using configured software to perform the registration process). In other cases, the registration might be performed manually by an administrator, e.g., by adding information to the centralized policy repository 130 (which, as noted above, might be an enterprise directory). In a set of embodiments, for example, the registration process will assign an identifier to each service, such that a call to the centralized policy repository 130 (e.g., via the API 145) can identify the service by the identifier. Registration of a service also might populate the information store 135 with the relevant trust information for the registered service. In a set of embodiments, registration of a service also might include modifying the service (and/or adding software to the server(s) on which the service runs, etc.) to enable the service to communicate with the centralized policy repository 130 when performing inter-service interactions.

The method 200 might further comprise providing (perhaps at the centralized policy repository 130) at least one authentication policy for the target service 125 (block 230). The authentication policy, as noted above, can be used to define a set of authentication requirements for the target service and/or providing (again, possibly at the centralized policy repository). Similarly, the method 200 comprises, in some cases, providing at least one authorization policy for the target service (block 235). As noted above, the authorization policy can be used to define a set of authorization requirements for the target service.

FIG. 3 illustrates a method of providing authentication and/or authorization (e.g., within a service-to-service trust framework) for an interaction between a source service 120 and a target service 125.

The exemplary method comprises, in some embodiments, a client 150 requesting an operation (e.g., from a source service 120) (block 305). As noted above, many different operations may be supported by various embodiments of the invention. The source service 120 then identifies the service that should perform the operation (block 310). In some cases, the source service 120 itself might perform the operation for the client 150. In other cases, however, the source service 120 might ascertain that the service request from the client 150 requests an operation to be performed by a target service 125 (perhaps at another computer 115). (There are a variety of ways known in the art for one service to identify another service as performing a particular operation, and this procedure therefore need not be described in detail herein. It should be noted, however, that in some embodiments, the source service 120 might consult with a centralized policy repository 130 and/or a directory to identify and/or locate an appropriate service and/or application to perform a requested operation).

In particular embodiments, the source service 120 (and/or the computer 110 on which it resides) might obtain from the centralized policy repository any information necessary to request the operation from the target service 125. In some cases, this might include requesting information about the policies of the target service 125 and/or specific requirements, capabilities, interfaces, etc. of the target service 125. In a particular case, the source service 120 (and/or the computer 110) obtains an identifier for itself (block 315). As noted above, the identifier might be, merely by way of example, an identifier that is unique across the enterprise trust framework and that allows identification of the service from among a plurality of services, users and/or other entities. In some cases, the identifier might be obtained at runtime, e.g., from the centralized policy repository 130 and/or via the API 145. In other cases, the source service 120 might store its identifier locally, such that obtaining the identifier simply comprises obtaining the identifier locally (e.g., from disk, from memory, etc.).

The source service 120 then might request the operation from the target service 125 (block 320). In some cases, the request comprises the identifier for the source service 120, thereby allowing the target service 125 to identify the service that should be authenticated and/or authorized. The target service 125 then receives the request for the operation. In response, the target service 125 might transmit (e.g., for reception by the centralized policy repository 130 and/or via the API 145) a request for authentication of the source service 120 (block 325). In some cases, the authentication request might the identifier, so that, for example, the centralized policy server 130 can identify trust information about the source service 120. In other cases, the request simply comprises a request for authentication information about the source service 120. In further cases, the request comprises a request for the centralized policy repository 130 itself to authenticate the source service 120.

The centralized policy repository 130 might receive the authentication request and/or identify the first service, e.g., based on the identifier provided with the request. Them method, then, might comprise determining, perhaps based on an authentication policy for the target service 125, a set of trust information required by the target service 125 for authentication (block 330). Merely by way of example, the target service 125, as noted above, might require a certain authentication protocol, a certain type of credentials, etc. The centralized policy repository 130 (and/or the centralized policy server 105) might check the trust information for the source service 120 (which might be stored in the information store 135, for example), to determine whether the required trust information exists. In some embodiments, the centralized policy repository 130 and/or centralized policy server 105 will authenticate the source service 120, based on the authentication policy(ies) of the target service and/or the stored trust information for the source service (if necessary and/or possible, the centralized policy repository 130 and/or centralized policy server 105 might be configured to obtain from the source service 120 any trust information not stored in the information store 130 that is required by the authentication policy(ies) of the target service 125).

The centralized policy repository 130 and/or centralized policy server 105 then provides a set of authentication information in response to the authentication request (block 335). As noted above, in some cases, the centralized policy repository 130 and/or centralized policy server 105 might be configured to perform the authentication of the source service 120, in which case the authentication might simply comprise an authentication status (e.g., a confirmation that the source service 120 has been authenticated, or has not). In other cases, the target service 125 (and/or another component of that computer 115) might be responsible for the authentication, in which case the authentication information might comprise sufficient information to allow the target service 125 to authenticate the source service 120.

Hence, the authentication information might comprise information (such as a password and/or a password verifier associated with the source service 120) that can be used by the target service 125 (and/or the computer 115) to authenticate (e.g., determine an authentication status of) the source service 120. Merely by way of example, in some embodiments, the authentication information might comprise a password verifier for the source service 120. If the request from the source service 120 for the operation comprised the password for the source service 120, then, the password verifier can be used by the target service 125 to verify the password of the source service 120 and thereby authenticate the service 120. The method 300 might comprise authenticating the source service 120 (block 340), e.g., at the centralized policy repository 130 (e.g., as described above), at the target service 125 and/or elsewhere.

In some embodiments, the authentication policy for the target service 125 specifies a set of authentication criteria a user must meet to authenticate with the source service 120. Merely by way of example, the authentication policy for the target service might specify that the source service must authenticate the client 150 (and/or a user thereof), perhaps using a particular protocol, before considering the source service 120 properly authenticated. Alternatively and/or additionally, as noted above the authentication policy for the target service 125 might specify a set of authentication criteria the source service 120 must meet to authenticate with the target service.

In certain embodiments, the target service 125 then might request authorization information about the source service 120 (e.g., about an authorization of the source service 120 to access the target service 125) (block 345). This request might be received by the centralized policy repository 130 and/or via the API 145. The method then, might include determining (perhaps based on an authorization policy for the target service 125) a set of authorization requirements for the source service 120. In accordance with various embodiments, the authorization policy for the target service 125 might specify a set of authentication and/or authorization criteria a user must meet to authorize with the source service 120 (for example, as noted above), and these might be included in the authorization requirements. The authorization policy might also specify which services are allowed to (and/or are not allowed to) request operations from the target service 125, perhaps irrespective of the authentication/authorization status of the client 150 and/or user. Such criteria might also be included in the authorization requirements. Any other applicable authorization requirements may be included as well.

The method 300, then, comprises providing a set of authorization information to the target service 125 (block 355). The authorization information might comprise any of several types of information. Merely by way of example, in some cases, the centralized policy repository 130 and/or centralized policy server 105 might perform the authorization of the source service 120 (e.g., by comparing the relevant trust information of the source service 120 with the authorization requirements and/or authorization policy of the target service 125), and the authorization information might simply comprise an authorization status (e.g., authorized or not authorized) of the source service 120 to request the operation from the target service 125. Alternatively and/or additionally, the target service 125 (and/or the associated computer 115) might be configured to perform the authorization, such that the authorization information might comprise sufficient information to allow the target service 125 to make such a determination. Such information might include relevant trust information about the source service 120, as well as, perhaps the authorization policy(ies) and/or requirements of the target service 125 (in some cases, the target service 125 may be aware of its own authorization policies and/or requirements, such that this information need not be transmitted to the target service 125).

In a particular implementation, an authorization status of the source service 120 might be determined at the centralized policy repository 130, based perhaps on the authorization policy for the target service 125 and/or the authorization requirements for the source service 120 (which might be specified by the policy). In other embodiments, the method 300 includes authorizing the source service 120 to request the function (either at the centralized policy repository 130 and/or server 105, at the target service 125 and/or computer 115, and/or elsewhere, as described above, for example). If the source service 120 is authorized to request the operation, the target service 125 then might perform the operation (block 265) and/or, optionally, provide any return data to the source service 120, which then might provide an appropriate response to the client 150.

Embodiments of the invention support a variety of configurations. Merely by way of example, in some embodiments, the target service might be provided by a first application (and/or a first computer) and/or the source service might be provided by a second application (and/or a second computer). In other embodiments, the target service and the source service might provided by the same application (and/or the same computer).

Other sets of embodiments provide software programs, including without limitation software programs comprising instructions executable by one or more computers to implement methods of the invention and/or software programs comprising instructions executable by systems of the invention, as described above, for example. In a particular set of embodiments, a software service-to-service framework might facilitate interactions between two or more services.

Figure 4:
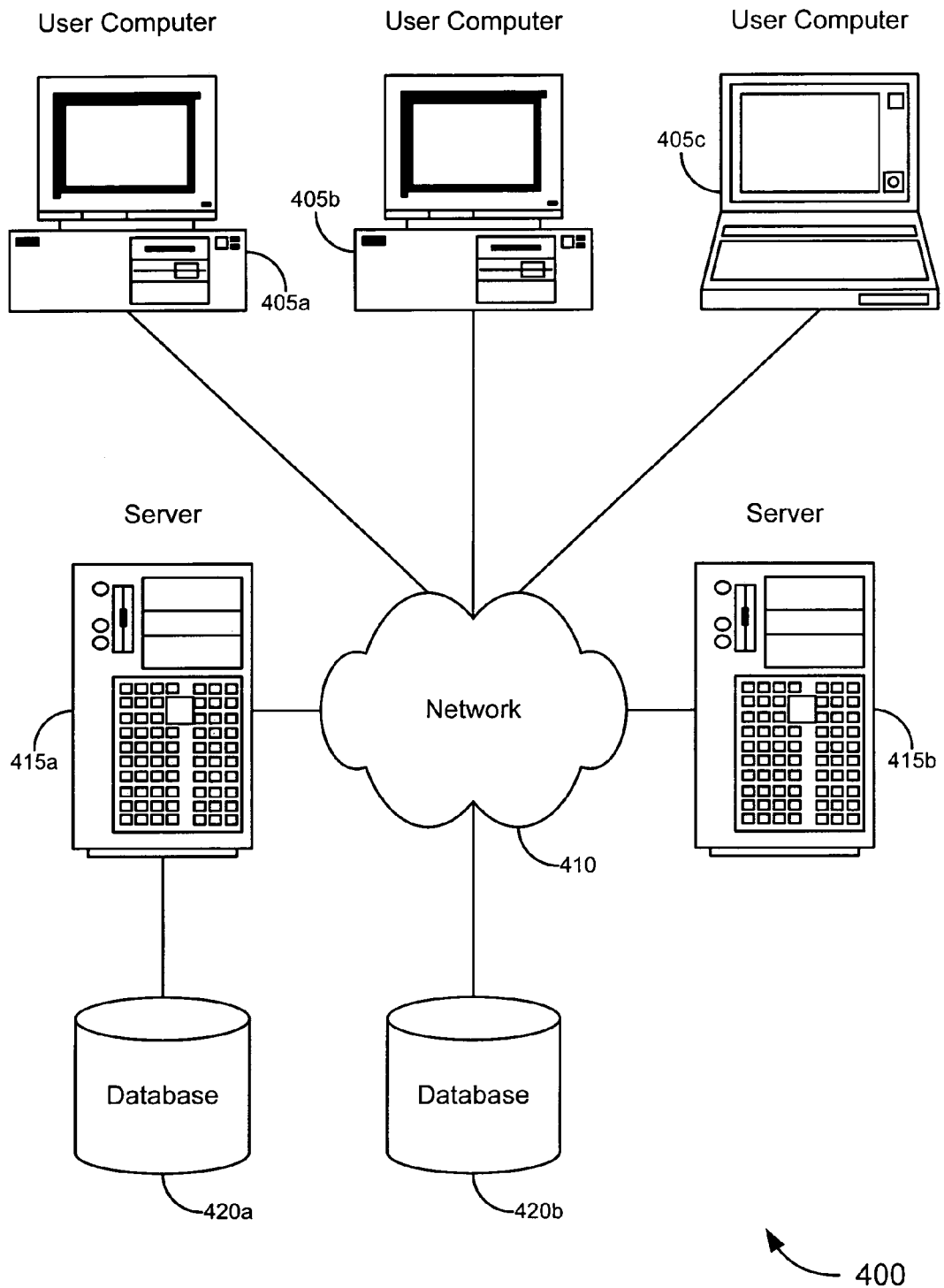
FIG. 4 is a block diagram illustrating the structural components of an enterprise network in which a service-to-service trust framework can be implemented, in accordance with various embodiments of the invention.

As noted above, a set of embodiments comprises systems for implementing a service-to-service trust framework and/or providing authentication and/or authorization for service-to-service interactions. Merely by way of example, FIG. 4 illustrates a schematic diagram of a system 400 that can be used in accordance with one set of embodiments. The system 400 can include one or more user computers 405 (which might serve as the clients 150 in the system 100 described by FIG. 1). The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer, Internet-enabled mobile telephone, and/or personal digital assistant, capable of communicating via a network (e.g., the network 410 described below) and/or displaying and navigating web pages or other types of electronic documents. Although the exemplary system 400 is shown with three user computers, any number of user computers can be supported.

Certain embodiments of the invention operate in a networked environment, which can include a network 410. The network 410 can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415 (which can function as the centralized policy server 105, requesting computer 110 and/or providing computer 115 in the system 100 of FIG. 1). Each of the server computers 415 may be configured with an operating system including without limitation any of those discussed above, as well as any commercially-available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention.

The server computers 415, in some embodiments, might include one ore more file and or/application servers, which can include one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 405 and/or another server 415. In some embodiments, an application server can create web pages dynamically for displaying the information in accordance with embodiments of the invention, such as by displaying for a user data provided to a calling service by a called service, as described above, for example. Data provided by an application server may be formatted as web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server.

In accordance with further embodiments, one or more servers 415 can function as a file server and/or can include one or more of the files necessary to implement methods of the invention incorporated by an application running on a user computer 405 and/or another server 415. Alternatively, as those skilled in the art will appreciate, a file server can include all necessary files, allowing such an application to be invoked remotely by a user computer 405 and/or server 415. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420, one or more of which might serve as the centralized policy repository and/or information store in accordance with some embodiments of the invention. Hence, one or more of the databases 420 might be implemented as a directory, such as an LDAP directory to name one example, in various embodiments of the invention.

The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 435 can be a relational database, such as an Oracle database, that is adapted to store, update, and retrieve data in response to SQL-formatted commands. The database might be controlled and/or maintained by a database server, as described above, for example.

Figure 5:
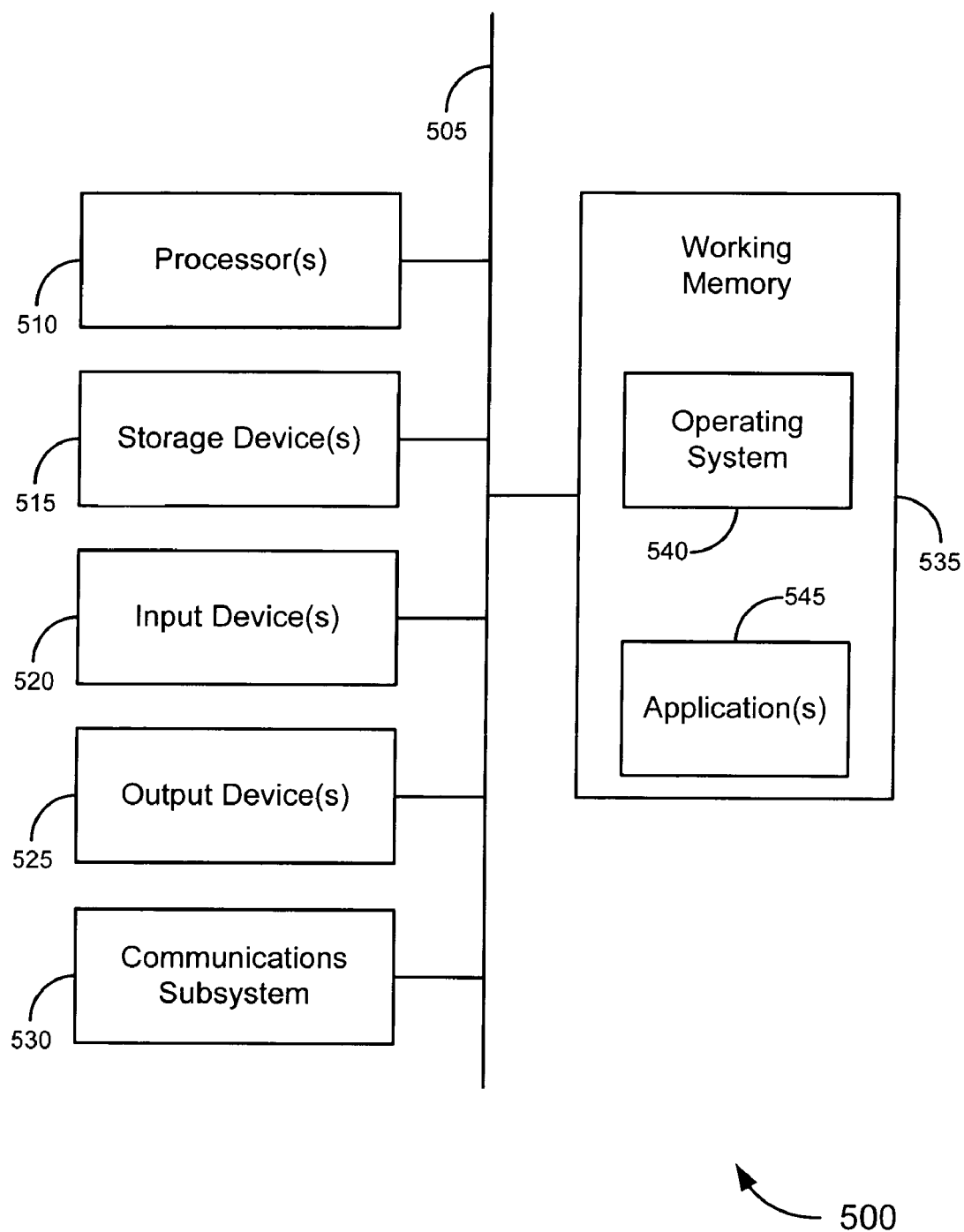
FIG. 5 is a generalized schematic diagram illustrating a computer system that may be used in accordance with various embodiments of the invention.

FIG. 5 provides a schematic illustration of one embodiment of a computer system 500 that can perform the methods of the invention and/or the functions of the centralized policy server 105, requesting computer 110, providing computer 115 and/or client 105, as described herein. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. The computer system 500 is shown comprising hardware elements that can electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 5 might also include a communications subsystem 530; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 530 may permit data to be exchanged with a network (such as the network 410 described above), and/or any other devices described herein.

In many embodiments, the computer system 500 will further comprise a memory 535, which can include a RAM or ROM device, as described above.

The computer system 500 also can comprise software elements, shown as being currently located within a working memory 535, including an operating system 540 and/or other code 545, such as one or more application programs, which may comprise computer programs of the invention and/or may be designed to implement methods of the invention, as described herein. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

While the invention has been described with respect to exemplary embodiments, one skilled in the art will recognize that numerous modifications are possible. Merely by way of example, while for convenience various embodiments above have been described with respect to services within an enterprise, other embodiments might be configured to support services both inside and/or outside of a particular enterprise, and/or across a plurality of enterprises. Alternatively, other embodiments might be configured to govern inter-service interactions only within a particular domain within an enterprise, etc.

Further, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. In an enterprise computing network, a system for providing authorization and authentication in response to a service request from a client computer, the system comprising:
   a centralized policy server comprising a centralized policy repository, the centralized policy repository comprising:
   (a) an information store configured to store a plurality of sets of trust information, each of the plurality of sets of trust information comprising trust information about one of a plurality of services;
   (b) one or more authorization models, each of the one or more authorization models comprising information about a mode of interaction between two or more services, the one or more authorization models comprising a first authorization model defining a first mode of interaction between a first service on a first server computer and a second service on a second server computer, the mode of interaction defining an authentication or authorization technique to be used between the first service and the second service;
   (c) one or more authentication policies, each of the one or more authentication policies defining a set of authentication requirements for a particular service, the one or more authentication policies comprising a first authentication policy that defines an authentication requirement that the first service on the first server computer must meet in order to authenticate with the second service on the second server computer; and
   (d) one or more authorization policies, each of the one or more authentication policies defining a set of authorization requirements for a particular service, the one or more authorization policies comprising a first authorization policy that defines an authorization requirement for the first service to authorize with the second service;
   the first server computer comprising a first processor and a first set of instructions executable by the first processor, the first set of instructions comprising:
   (a) instructions to receive the first service the service request from the client computer;
   (b) instructions to ascertain that the service request requests an operation to be performed by the second service at the second server computer;
   (c) instructions to obtain from the centralized policy repository an identifier of the second service;
   (d) instructions to transmit an operation request for reception by the second server computer, the operation request comprising the identifier of the first service and requesting performance of the operation;
   the second server computer comprising a second processor and a second set of instructions executable by the second processor, the second set of instructions comprising:
   (a) instructions to receive, with the second service, the operation request from the first server computer;
   (b) instructions to transmit an authentication request for reception by the centralized policy server, the authentication request comprising the identifier;
   (c) instructions to transmit an authorization request for reception by the centralized policy server; and
   (d) instructions to provide the requested operation, based on an authentication status and an authorization status of the first server; and
   an application programming interface ("API") configured allow the first service and the second service to communicate with the centralized policy repository;
   wherein the centralized policy server further comprises a third processor and a third set of instructions executable by the third processor, the third set of instructions comprising:
   (a) instructions to receive the authentication request;
   (b) instructions to identify the first service, based on the identifier;
   (c) instructions to determine, based on the first authentication policy, a set of authentication information for the first service, the set of authentication information being sufficient to authenticate the first service;
   (d) instructions to provide the set of authentication information to the second server computer;
   (d) instructions to receive the authorization request;
   (e) instructions to determine, based on an authorization policy for the second service, a set of authorization information for the first service, the set of authorization information being sufficient to indicate whether the first service is authorized for the second service; and
   (f) instructions to provide the set of authorization information to the second server computer.

2. In a computer environment comprising a plurality of services distributed across a plurality of network nodes, the plurality of services comprising a target service that is configured to perform a requested operation and a source service that requests the requested operation, an apparatus for of providing authentication and authorization among the plurality of services, the apparatus comprising:
   a computer readable storage medium having encoded thereon a set of one or more instructions executable by a computer system to perform one or more operations, the set of instructions comprising:
   instructions for maintaining, at a centralized policy repository on the computer system, an authentication policy for the target service, the authentication policy defining an authentication requirement that the source service must meet in order to authenticate with the target service;
   instructions for maintaining, at the centralized policy repository on the computer system, an authorization policy for the target service;
   instructions for receiving, at the centralized policy repository on the computer system, a first request from the target service, the first request comprising a request for authentication information about the source service;
   instructions for determining, at the centralized policy repository and based on the authentication policy for the target service, a set of trust information required by the target service for authentication;
   instructions for providing a first response to the target service from the centralized policy repository, the first response comprising information for authenticating the source service;
   instructions for receiving, at the centralized policy repository, a second request from the target service, the second request comprising a request for authorization information about an authorization of the source service to access the target service;
   instructions for determining, at the centralized policy repository and based on the authorization policy for the target service, a set of authorization requirements for the source service; and
   instructions for providing a second response to the target from the centralized policy repository, the second response comprising information about authorizing the source service.

3. An apparatus as recited by claim 2, wherein the authentication policy for the target service specifies a set of authentication criteria a user must meet to authenticate with the source service.

4. An apparatus as recited by claim 2, wherein the authentication policy for the target service specifies a set of authentication criteria the source service must meet to authenticate with the target service.

5. An apparatus as recited by claim 2, wherein the instructions for providing a first response to the target service comprise instructions for providing sufficient information to allow the target service to authenticate the target service.

6. An apparatus as recited by claim 2, wherein the set of instructions further comprises instructions for authenticating the source service at the centralized policy repository, based on the set of trust information required by the target service for authentication, wherein the instructions for providing a first response to the target service comprise instructions for providing an authentication status of the source service.

7. An apparatus as recited by claim 2, wherein the authorization policy for the target service specifies a set of authorization criteria a user must meet to authorize with the source service.

8. An apparatus as recited by claim 2, wherein the set of instructions further comprises instructions for authorizing the source service at the centralized policy repository, based on the authorization requirements for the source service, wherein providing a second response to the target service comprises providing an authorization status of the source service.

9. An apparatus as recited by claim 2, wherein the instructions for providing a second response to the target service comprise instructions for providing sufficient information to allow the target service to authorize the source service.

10. An apparatus as recited by claim 2, wherein the centralized policy repository comprises a lightweight directory access protocol ("LDAP") directory.

11. An apparatus as recited by claim 2, wherein the first request and the second request are received via an application programming interface ("API") configured to facilitate communication between the plurality of services and the centralized policy repository.

12. An apparatus as recited by claim 2, wherein the target service is provided by a first application and wherein the source service is provided by a second application.

13. An apparatus as recited by claim 2, wherein the target service and the source service are provided by the same application.

14. In a computer environment comprising a plurality of services distributed across a plurality of network nodes, a method of providing a service-to-service trust framework to allow interoperability between two or more services, the method comprising:
providing, at a centralized policy repository on a computer system, an information store configured to store trust information related to each of the plurality of services;
providing one or more authorization model to define an interaction between the two or more services, wherein the two or more services comprise a target service that is configured to perform a requested operation and a source service that requests the requested operation, the one or more authorization models comprising a first authorization model defining a first mode of interaction between the source service and the target service, the first mode of interaction defining an authentication or authorization technique to be used between the source service and the target service;
providing, at the centralized policy repository on the computer system, at least one authentication policy for the target service to define a set of authentication requirements that the source service must meet in order to authenticate with the target service;
providing, at the centralized policy repository on a computer system, at least one authorization policy for the target service to define a set of authorization requirements the target service; and
providing, at the computer system, an application programming interface ("API") to allow each of the two or more services to communicate with the information store.

15. A method as recited by claim 14, wherein the information store is centralized within an enterprise-wide network.

16. A method as recited by claim 14, further comprising:
providing an administration model defining a procedure for managing information in the information store.

17. A method as recited by claim 14, further comprising:
receiving, at the information store and via the API, a request from the target service to authenticate the source service;
authenticating the source service at the information store, based on the authentication policy; and
providing a response to the request, the response indicating an authentication status of the source service.

18. A method as recited by claim 17, wherein the source service serves as a proxy for separate entity, and wherein authenticating the source service comprises verifying an authentication of the separate entity according to the authentication policy.

19. A method as recited by claim 18, wherein the separate entity is a user of the source service.

20. A method as recited by claim 14, further comprising:
receiving, at the information store and via the API, a request from the target service to authorize the source service to obtain the requested operation;
determining, based on the authorization model, whether the source service is authorized to obtain the requested operation; and
providing a response to the request from the target service, the response comprising an authorization status of the source service.

21. A method as recited by claim 20, wherein the source service serves as a proxy for separate entity, and wherein authorizing the source service comprises verifying an authorization of the separate entity to use the source service according to the authorization policy.

22. A method as recited by claim 20, wherein the source service serves as a proxy for separate entity, and wherein authorizing the source service comprises verifying an authorization of the separate entity to use the target service according to the authorization policy.

23. In a computer environment comprising a plurality of services distributed across a plurality of network nodes, an apparatus for implementing a service-to-service trust framework for facilitating interactions between two or more services, the apparatus comprising:
a computer readable medium having encoded thereon a set of instructions executable by one or more computer systems, the set of instructions comprising:
instructions for providing an information store configured to store trust information related to each of the plurality of services;
instructions for providing one or more authorization model to define an interaction between the two or more services, wherein the two or more services comprise a target service that is configured to perform a requested operation and a source service that requests the operation, the one or more authorization models comprise a first authorization model defining a first mode of interaction between the source service and the target service, the first mode of interaction defining an authentication or authorization technique to be used between the source service and the target service;

instructions for providing at least one authentication policy for the target service to define a set of authentication requirements that the source service must meet in order to authenticate with the target service;

instructions for providing at least one authorization policy for the target service to define a set of authorization requirements for the target service; and instructions for providing an application programming interface ("API") to allow each of the two or more services to communicate with the information store.

* * * * *

UNITED STATES PATENT AND TRADEMARK OFFICE
CERTIFICATE OF CORRECTION

PATENT NO. : 7,721,322 B2  Page 1 of 1
APPLICATION NO. : 11/387644
DATED : May 18, 2010
INVENTOR(S) : Hari V. N. Sastry et al.

It is certified that error appears in the above-identified patent and that said Letters Patent is hereby corrected as shown below:

In column 20, line 26, in claim 2, after "for" delete "of".

Signed and Sealed this
Twelfth Day of July, 2011

David J. Kappos
*Director of the United States Patent and Trademark Office*